United States Patent [19]
Ohta et al.

[11] Patent Number: 6,088,477
[45] Date of Patent: *Jul. 11, 2000

[54] SYSTEM FOR CONTROLLING AN AMOUNT OF UNDERCOLOR REMOVAL BASED ON A GRAYNESS SIGNAL, A DARKNESS SIGNAL, AND A BLACK SIGNAL

[75] Inventors: Ken-ichi Ohta, Kawasaki; Akihiro Usami, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/782,810

[22] Filed: Jan. 13, 1997

Related U.S. Application Data

[62] Division of application No. 08/550,520, Oct. 30, 1995, Pat. No. 5,673,335, which is a continuation of application No. 08/111,403, Aug. 25, 1993, abandoned.

[30] Foreign Application Priority Data

| Aug. 26, 1992 | [JP] | Japan | 4-226856 |
| Jan. 8, 1993 | [JP] | Japan | 5-001685 |

[51] Int. Cl.⁷ ............... G06K 9/00; G03F 3/08; G03G 15/01
[52] U.S. Cl. ............ 382/167; 358/1.9; 358/521; 399/40; 399/231
[58] Field of Search .................. 382/162, 167, 382/163; 358/529, 1.9, 515, 518, 517, 520, 521, 530; 430/42, 43, 44; 399/39, 40, 231; 101/135, 136, 137, 138, 139, 140, 211

[56] References Cited

U.S. PATENT DOCUMENTS

| 3,972,066 | 7/1976 | Seki et al. | 358/527 |
| 4,636,844 | 1/1987 | Sasaki | 358/515 |
| 4,908,712 | 3/1990 | Uchiyama et al. | 358/298 |
| 4,930,007 | 5/1990 | Sugiura et al. | 358/530 |
| 4,965,664 | 10/1990 | Udagawa et al. | 358/80 |
| 5,081,529 | 1/1992 | Collette | 358/80 |
| 5,113,248 | 5/1992 | Hibi et al. | 358/501 |
| 5,134,667 | 7/1992 | Suzuki | 382/22 |
| 5,172,223 | 12/1992 | Suzuki et al. | 358/79 |
| 5,181,104 | 1/1993 | Sugishima et al. | 358/500 |
| 5,216,498 | 6/1993 | Matsunawa et al. | 357/75 |
| 5,220,620 | 6/1993 | Nakano et al. | 382/17 |
| 5,305,119 | 4/1994 | Rolleston et al. | 358/522 |
| 5,343,312 | 8/1994 | Hibi et al. | 358/520 |
| 5,357,353 | 10/1994 | Hirota | 358/530 |
| 5,359,437 | 10/1994 | Hibi | 358/529 |
| 5,386,305 | 1/1995 | Usami | 358/518 |

FOREIGN PATENT DOCUMENTS

| 56-135842 | 10/1981 | Japan. |
| 56-140350 | 11/1981 | Japan. |
| 63-183459 | 7/1988 | Japan. |

OTHER PUBLICATIONS

Shimizu, Toshihiro, Undercolor Removal Method and Device, PTO 98–2718 (translation), Japanese Kokai Patent Application No. Sho 56[1981]–135842, 1981, pp. 1–19.

*Primary Examiner*—Edward L. Coles
*Assistant Examiner*—David Rosenblum
*Attorney, Agent, or Firm*—Fitzpatrick, Cella, Harper & Scinto

[57] ABSTRACT

A color image processing system for performing undercolor removal. The system includes input of a color image signal, generation of a grayness signal from the color image signal, generation of a darkness signal from the color image signal, and performance of undercolor removal based on the grayness signal, the darkness signal, and a black signal corresponding to the color image signal. The system also includes control of an amount of undercolor removal performed on the color image signal so that a gradient of an amount of undercolor removal performed on the color image signal relative to the grayness signal at a first darkness signal level is lower than a gradient of an amount of undercolor removal performed on the color image signal relative to the grayness signal at a second darkness signal level, wherein the second darkness signal level is lower than the first darkness signal level.

8 Claims, 11 Drawing Sheets

6,088,477

SYSTEM FOR CONTROLLING AN AMOUNT OF UNDERCOLOR REMOVAL BASED ON A GRAYNESS SIGNAL, A DARKNESS SIGNAL, AND A BLACK SIGNAL

This application is a division of application Ser. No. 08/550,520, filed Oct. 30, 1995, now U.S. Pat. No. 5,673,335, which is a continuation of application Ser. No. 08/111,403, filed Aug. 25, 1993, now abandoned.

BACKGROUND OF THE INVENTION

This invention relates to a method and apparatus for color-image processing and, more particularly, to a color-image processing method and apparatus in which entered image signals separated into the three primary colors are converted into color signals when a visible image is outputted in the form of a hard copy.

In a color-image processing apparatus of this type known in the prior art, separated color signals entered as R, G and B usually are converted into color signals Y (yellow), M (magenta), C (cyan) and K (black), which constitute a subtractive mixture of color stimuli, by an arrangement of the kind shown in FIG. 1, and the resulting color signals are outputted in order to obtain a hard copy of the separated color signals.

As illustrated in FIG. 1, the three primary-color signals R, G, B entered from signal lines 101 are converted into complementary colors C, M, Y by a logarithmic converting circuit 102, and the signal K, which is the minimum value of C, M, Y [i.e., K=min(C,M,Y)], is produced by a minimum-value extracting circuit 103. The complementary C, M, Y signals resulting from the conversion are transformed into signals C', M', Y' by a matrix transformation circuit 104, generally referred to as a masking circuit, in order to correct unnecessary absorption components of the pigments used in a hard-copy output apparatus. Here a transformation equation indicated by Equation (1) below holds, where $A_{ij}$ represents a predetermined coefficient.

$$\begin{vmatrix} C' \\ M' \\ Y' \end{vmatrix} = \begin{vmatrix} A_{11} & A_{12} & A_{13} \\ A_{21} & A_{22} & A_{23} \\ A_{31} & A_{32} & A_{33} \end{vmatrix} \begin{vmatrix} C \\ M \\ Y \end{vmatrix} \quad (1)$$

The C', M', Y' signals obtained in accordance with Equation (1) are output signals for obtaining a hard copy of the input signal. Since black is reproduced by mixing the C', M', Y' signals together in equal amounts, black usually is substituted for part of C', M', Y' by processing referred to as UCR (undercolor removal).

A UCR circuit 105 produces four primary-color output signals C", M", Y", K" from C', M', Y' and K' in accordance with Equation (2) below, in which $B_i$ represents a predetermined coefficient. These final signals are outputted on signal lines 106.

$$C''=C'-B_1 \times K$$

$$M''=M'-B_2 \times K$$

$$Y''=Y'-B_3 \times K$$

$$K''=B_4 \times K \quad \ldots (2)$$

The C", M", Y", K" signals generated in accordance with Equation (2) are sent to a printer output unit (not shown), which executes the above-described processing in pixel units to form a visible color image.

However, in the example of the prior art set forth above, the coefficients $B_i$ used in Equation (2) generally are values not uniquely defined. That is, it is possible for C', M', Y' to be replaced by K in a certain percentage. If $B_i=1$ holds, the components corresponding to the minimum values among C', M', Y' will all be replaced by K. This generally is referred to as 100% UCR. If $B_i=0$ holds, UCR is not performed. In many cases Bi takes on a value between 0 and 1.

As obvious from the foregoing description, at $B_i=1$ the printer output unit is capable of effecting substitution by the K signal since 100% UCR is applied. However, since substitution by the K signal is carried out even at flesh-color portions and highlight-color portions of pastel colors, there is a decline in overall hue and color reproducibility.

SUMMARY OF THE INVENTION

An object of the present invention is to provide a color-image processing method and apparatus whereby substitution by the K signal can be performed efficiently and a decline in color reproducibility prevented.

According to the present invention, the foregoing object is attained by providing a color-image processing apparatus comprising logarithmic converting means for logarithmically converting color-separated image signals, minimum-value extracting means for extracting a minimum-value signal pixel by pixel based upon the image signals converted by the logarithmic converting means, transformation means for subjecting the color-separated image signals and the minimum-value signals extracted by the minimum-value extracting means to a matrix transformation in accordance with prescribed transformation coefficients, and output means for outputting signals, which are obtained by the transformation means, as output signals, wherein a sum of prescribed terms of the transformation coefficients is 0 or a value approximating 0.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments according to the present invention will now be described in detail with reference to the accompanying drawings.

<First Embodiment>

Figure 1:
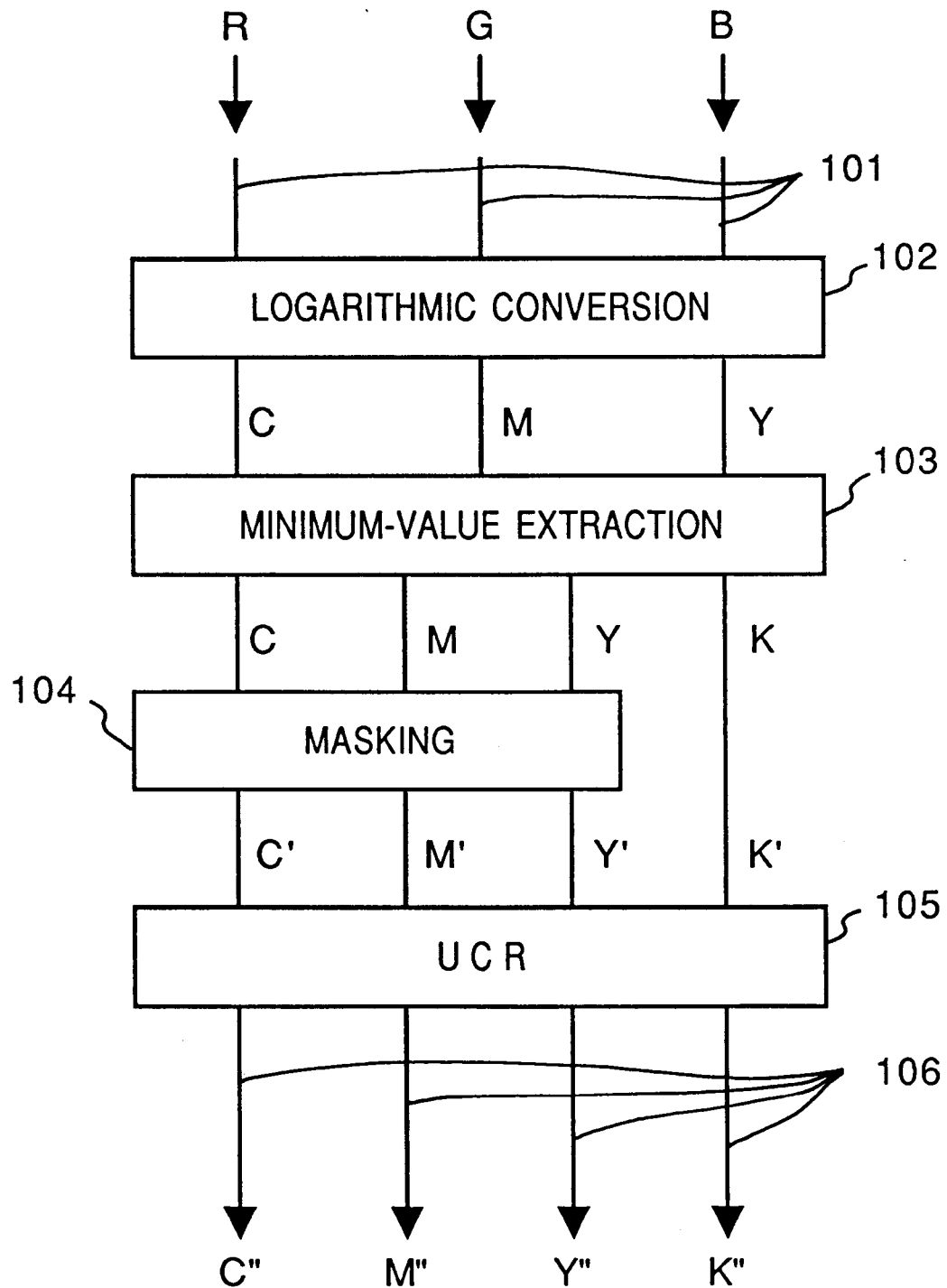
FIG. 1 is a block diagram illustrating the configuration of a color-image processing apparatus according to the prior art.
Figure 2:
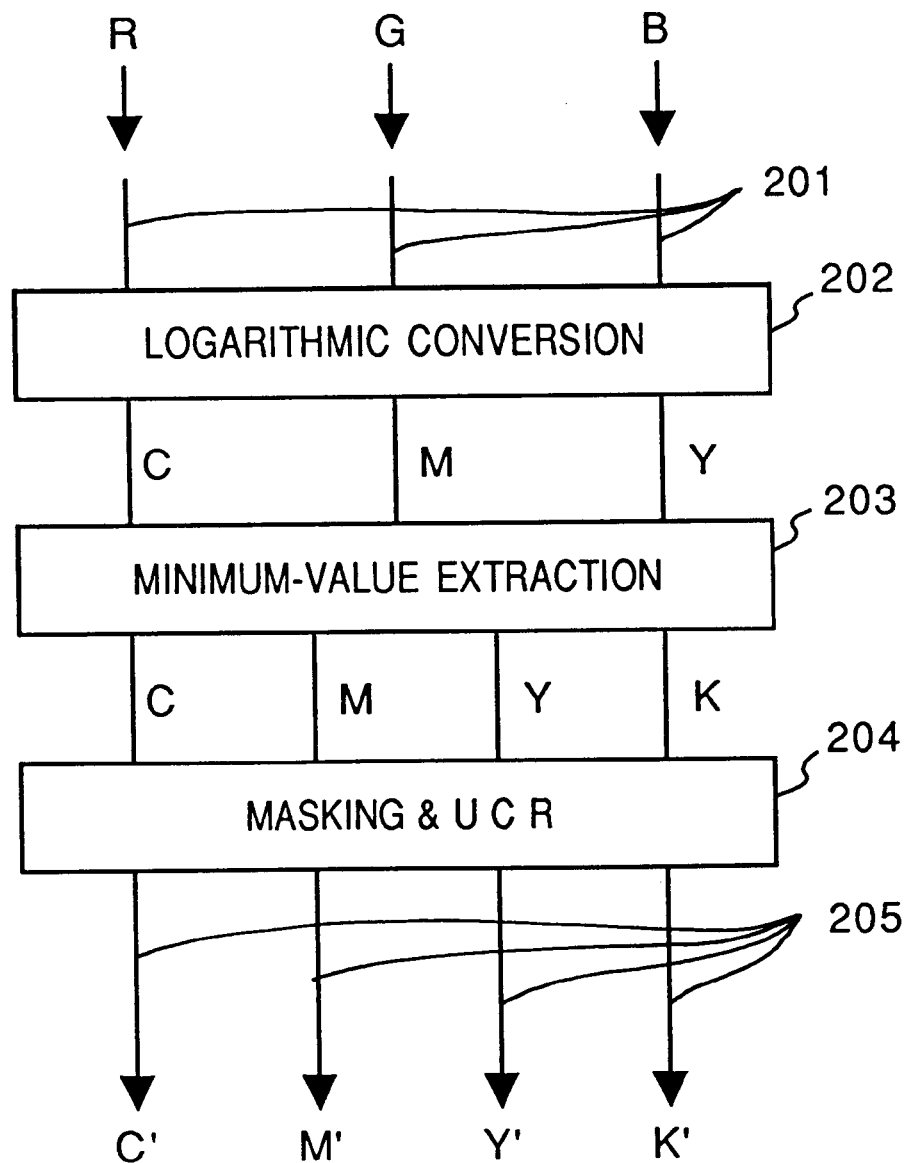
FIG. 2 is a block diagram illustrating the configuration of a color-signal processing circuit according to a first embodiment of the present invention.

FIG. 2 is a block diagram illustrating a color-signal processing circuit provided in a color-image processing apparatus according to a first embodiment of the present invention. The color-signal processing circuit of FIG. 2 includes signal lines 201, a logarithmic converting circuit 202, a minimum-value extracting circuit 203, a masking & UCR circuit 204 and signal lines 205.

The operation of this arrangement will now be described.

Three color-separated signals R, G, B which enter from the signal lines 201 are converted into signals C, M, Y of the complementary colors by the logarithmic converting circuit 202, and a K signal [=min(C,M,Y)] is extracted by the minimum-value extracting circuit 203. The C, M, Y, K signals enter the masking & UCR circuit 204, which subjects these signals to a matrix transformation to obtain C', M', Y', K' in accordance with Equation (3) below, where $A_{ij}$ represents a predetemined coefficient .

$$\begin{vmatrix} C' \\ M' \\ Y' \\ K' \end{vmatrix} = \begin{vmatrix} A_{11} & A_{12} & A_{13} & A_{14} \\ A_{21} & A_{22} & A_{23} & A_{24} \\ A_{31} & A_{32} & A_{33} & A_{34} \\ A_{41} & A_{42} & A_{43} & A_{44} \end{vmatrix} \begin{vmatrix} C \\ M \\ Y \\ K \end{vmatrix} \quad (3)$$

Figure 3:
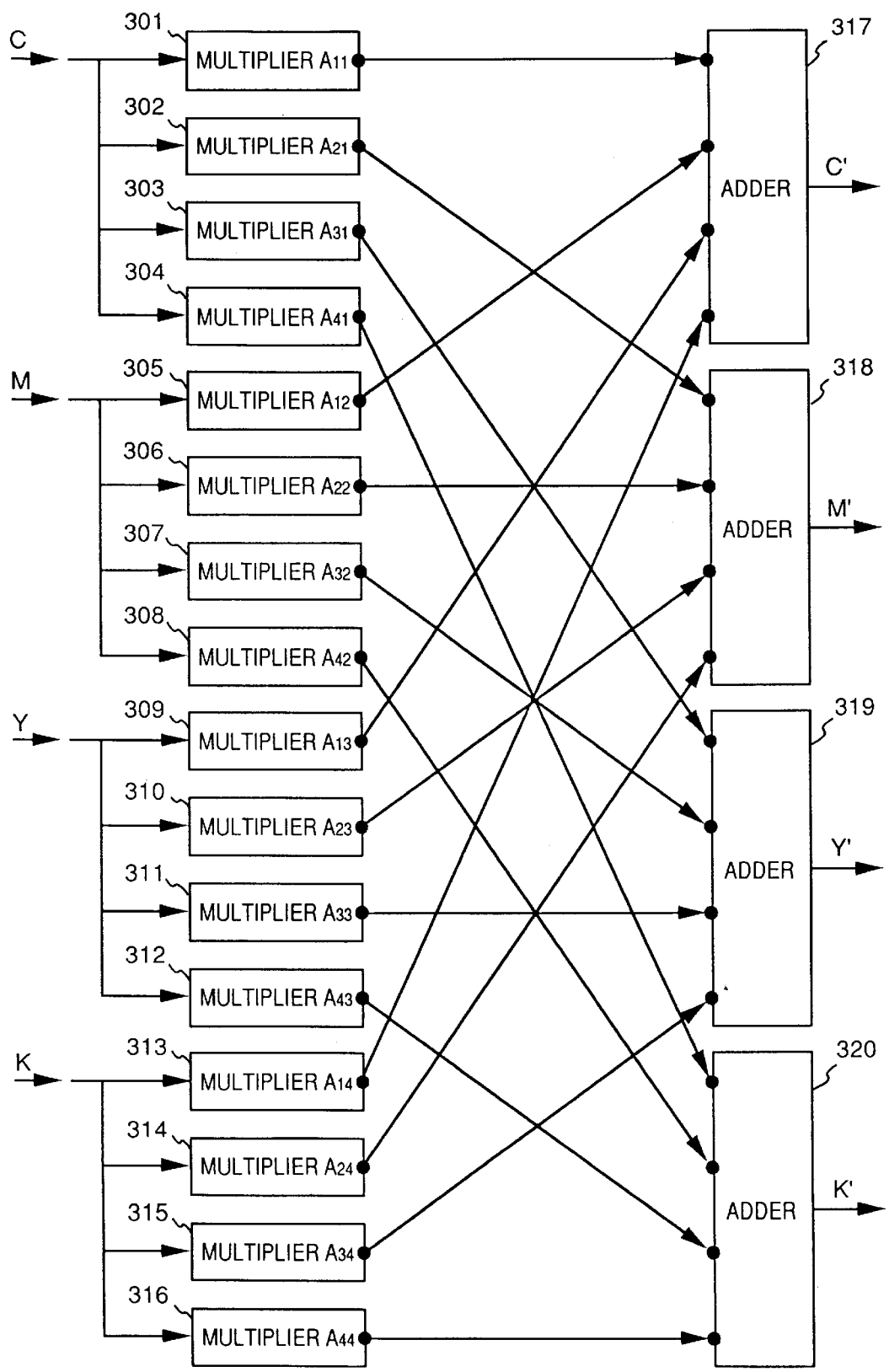
FIG. 3 is a block diagram illustrating the configuration of a masking circuit according to the first embodiment of the present invention.

FIG. 3 is a block diagram illustrating an example of a masking & UCR circuit for realizing Equation (3). The circuit of FIG. 3 includes multipliers 301~316 and adders 317~320.

The operation of the circuit shown in FIG. 3 will now be described.

The C, M, Y, K signals are applied from the left side so that multiplication of the signal values and coefficients in Equation (3) is performed by the multipliers 301~316. The adders 317~320 add the results of multiplication color by color to produce output signals C', M', Y', K' on the right side of FIG. 3. A case will now be considered in which certain conditions are set for the coefficients $A_{ij}$.

By way of example, assume a case in which an input image signal is gray, which is achromatic. When it is so arranged that the C', M', Y', K that will be outputted will become C'=M'=Y'=0 and only K' is extracted as a non-zero value, UCR is substantially 100% UCR and an achromatic image can be obtained as a hard copy in which black (K) is the sole color. In other words, if consideration is given to a case in which the input image signal is achromatic, the following condition will hold for the input signals C, M, Y:

$$C=M=Y+K \quad \ldots (4)$$

If the coefficients $A_{ij}$ in Equation (3) are related as follows, i.e., if Equations (5) are satisfied, then output signal C'=M'=Y'=0 is obtained:

$$A_{11}+A_{12}+A_{13}+A_{14}=0$$

$$A_{21}+A_{22}+A_{23}+A_{24}=0$$

$$A_{31}+A_{32}+A_{33}+A_{34}=0 \quad \ldots (5)$$

Accordingly, if the coefficients $A_{ij}$ are obtained by the method of least squares on the basis of the restraining condition that Equation (5) be satisfied, 100% UCR will be possible and color reproducibility also will be assured.

In accordance with the first embodiment, as described above, there is provided a hard-copy apparatus using the four colors of C, M, Y and K, in which entered color signals of the three primary colors are transformed into color signals of the four primary colors C, M, Y, K at a UCR ratio approximating 100% without sacrificing color reproducibility.

<Modification 1>

In the first embodiment, masking and UCR processing are performed in accordance with Equation (3). However, the present invention is not limited to this arrangement and can be modified in various ways.

First, a case will be described in which masking and UCR processing are performed in accordance with Equation (6) below rather than Equation (3).

$$\begin{vmatrix} C' \\ M' \\ Y' \\ K' \end{vmatrix} = \begin{vmatrix} A_{11} & A_{12} & A_{13} & A_{14} & A_{15} & A_{16} & A_{17} & A_{18} \\ A_{21} & A_{22} & A_{23} & A_{24} & A_{25} & A_{26} & A_{27} & A_{28} \\ A_{31} & A_{32} & A_{33} & A_{34} & A_{35} & A_{36} & A_{37} & A_{38} \\ A_{41} & A_{42} & A_{43} & A_{44} & A_{45} & A_{46} & A_{47} & A_{48} \end{vmatrix} \begin{vmatrix} C \\ M \\ Y \\ K \\ CM \\ CY \\ MY \\ KK \end{vmatrix} \quad (6)$$

Equation (6) is referred to as two-dimensional masking which, in comparison with Equation (3), enables processing of a higher order so that color reproducibility can be improved. The conditions for establishing the relation C'=M'=Y'=0 for 100% UCR, namely when the input C, M, Y, K signals are related by C=M=Y=K, in Equation (6) are indicated by Equation (7) below.

$$A_{11}+A_{12}+A_{13}+A_{14}=0$$

$$A_{21}+A_{22}+A_{23}+A_{24}=0$$

$$A_{31}+A_{32}+A_{33}+A_{34}=0$$

$$A_{15}+A_{16}+A_{17}+A_{18}=0$$

$$A_{25}+A_{26}+A_{27}+A_{28}=0$$

$$A_{35}+A_{36}+A_{37}+A_{38}=0 \quad \ldots (7)$$

As in the first embodiment, it will suffice to obtain the coefficients $A_{ij}$ by the law of least squares on the basis of the restraining condition that Equation (7) be satisfied. Further, since higher order masking is performed in the first modification, color reproducibility is improved over that of the first embodiment.

<Modification 2>

In a second modification, Equation (6) is used for the masking and UCR processing, just as in the first modification, and Equation (8) below is adopted as the restraining condition, thereby providing an even greater improvement in color reproducibility. This will now be described.

Specifically, the following restraining condition is applied, with S1, S2 being adopted as certain decided constants:

$$A_{11}+A_{12}+A_{13}+A_{14}=S_1$$

$$A_{21}+A_{22}+A_{23}+A_{24}=S_1$$

$$A_{31}+A_{32}+A_{33}+A_{34}=S_1$$

$$A_{15}+A_{16}+A_{17}+A_{18}=S_2$$

$$A_{25}+A_{26}+A_{27}+A_{28}=S_2$$

$$A_{35}+A_{36}+A_{37}+A_{38}=S_2 \quad \ldots (8)$$

Since Equation (8) does not satisfy Equation (7), the effect of 100% UCR is not obtained. However, since the UCR ratio can be adjusted by the values of S1 and S2, this modification is very effective in a case where great importance is attached to color reproducibility.

Thus, in accordance with the first embodiment, as described above, there is provided a hard-copy apparatus using the four colors of C, M, Y and K, in which entered color signals of the three primary colors are transformed into color signals of the four primary colors C, M, Y, K at a UCR ratio approximating 100% without sacrificing color reproducibility.

<Second Embodiment>

A second embodiment of the present invention will now be described with reference to the drawings.

Figure 4:
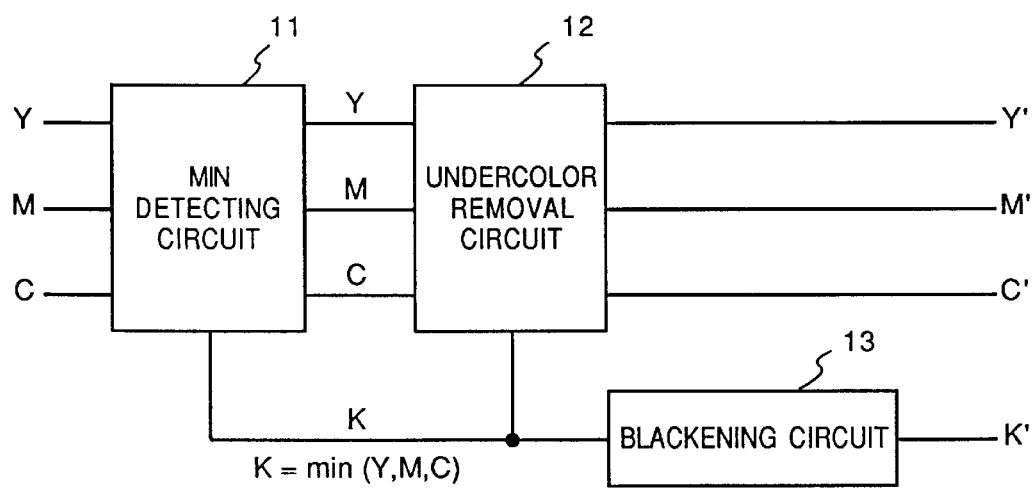
FIG. 4 is a circuit diagram for describing undercolor removal processing.

In conventional undercolor-removal processing, as shown in FIG. 4, a black signal K=min(Y,M,C) is calculated pixel by pixel from the Y (yellow), M (magenta) and C (cyan) image signals by a min detecting circuit 11, and an undercolor removal circuit 12 and black signal generating circuit 13 perform undercolor removal and blackening printing as indicated by the following equations, where α, β, γ and δ represent constants and SP represents a standing point:

$$Y'=Y-\alpha \cdot (K-SP)$$

$$M'=M-\beta \cdot (K-SP)$$

$$C'=C-\lambda \cdot (K-SP)$$

$$K'=\delta (K-SP)$$

Figure 5A:
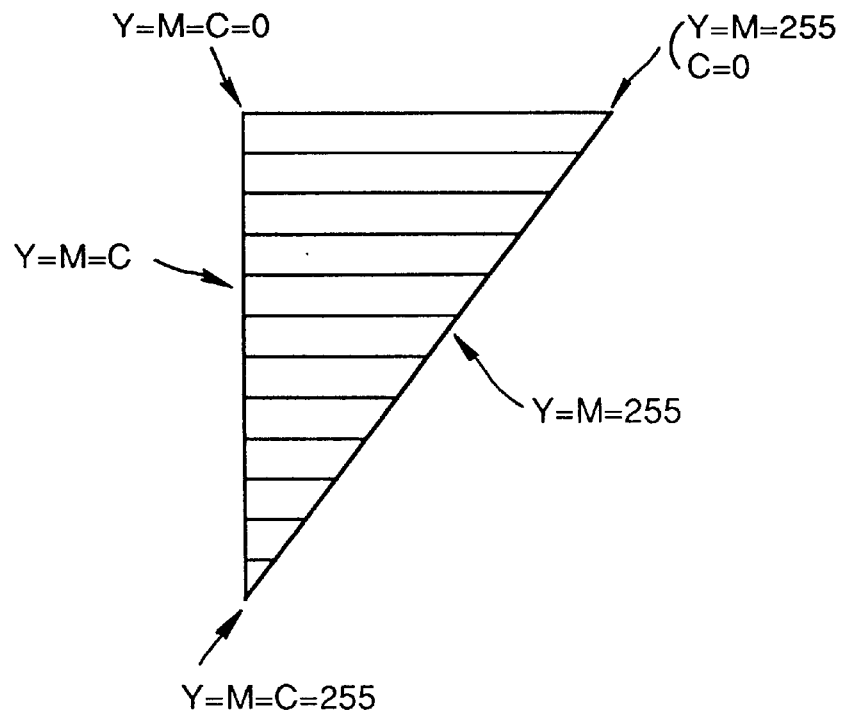
FIGS. 5A and 5B are useful in describing the characteristics of a black signal K"
Figure 5B:
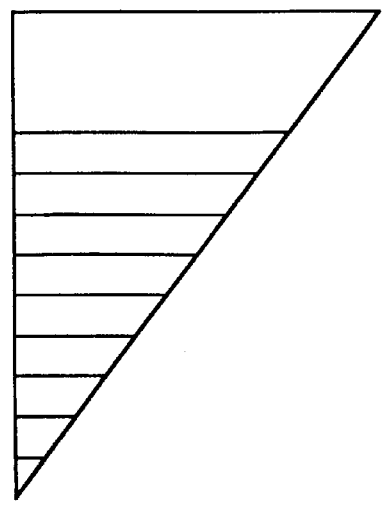
Figure 6:
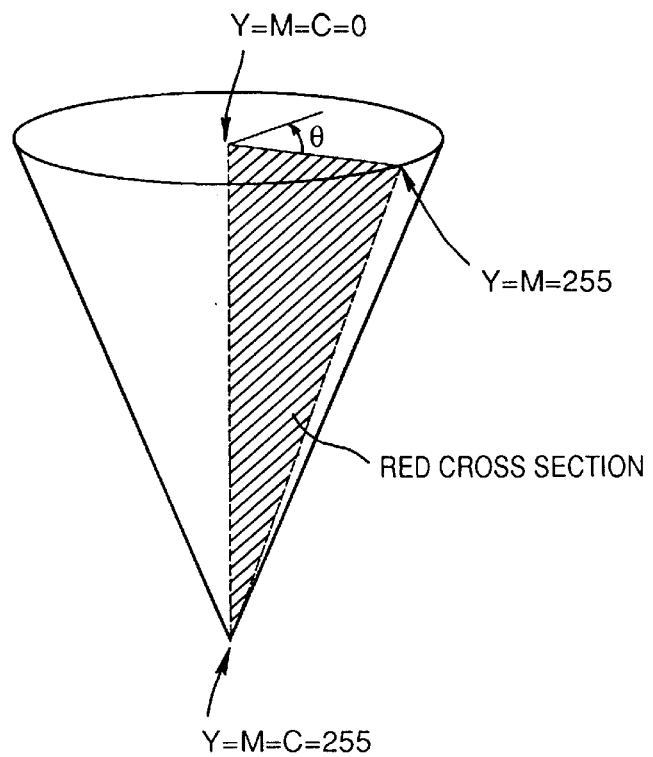
FIG. 6 is useful in describing the characteristics of the black signal K"

Focusing attention on portions common to Equation (4), we write K"=a·(K-SP) anew, where a is a constant. This situation is illustrated in FIGS. 5A and 5B. Further, in FIG. 6, which is for augmenting the description of FIGS. 5A and 5B, the θ direction of the circle represents hue, and the shaded portion represents the cross section of the color red (Y=M). The horizontal axis in FIGS. 5A and 5B indicates that Y and M increase to the right from Y=M=C=0 in a state in which C=0 holds as is and Y=M. The vertical axis in FIGS. 5A and 5B indicates that Y, M, C increase downwardly from Y=M=C=0 in a state in which Y=M =C holds as is. Further, the horizontal axis indicates the contour line of K". FIG. 5A is for a case in which SP=0 and a=1 hold.

Figure 7A:
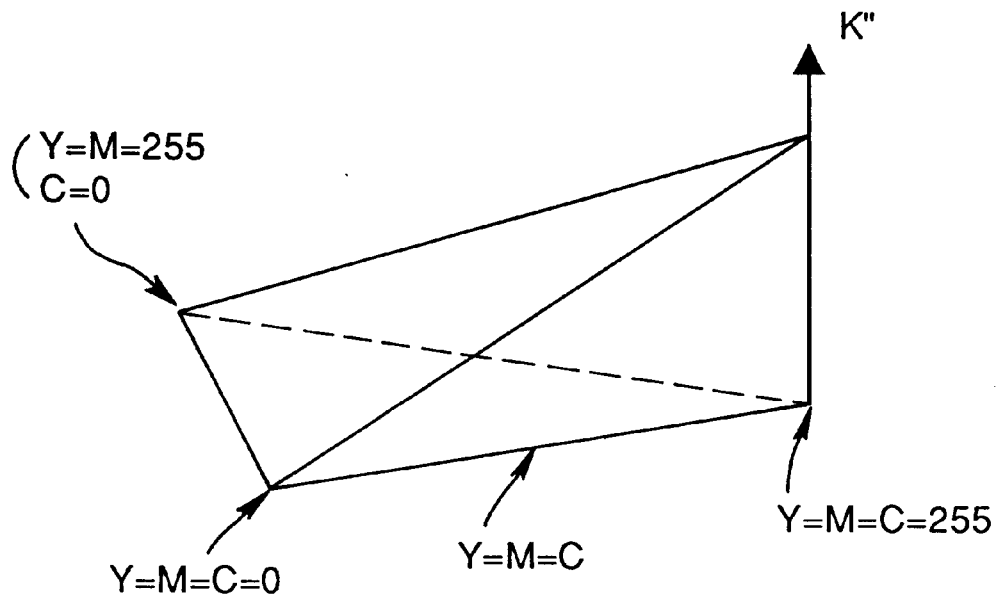
FIGS. 7A and 7B are diagrams representing FIGS. 5A and 5B three-dimensionally.
Figure 7B:
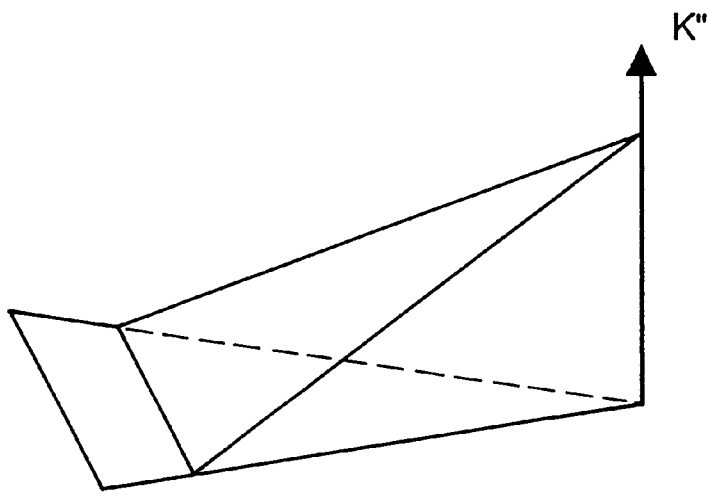

Further, in FIG. 5B, SP>0 and a>1 hold. Ordinarily, operation is carried out as shown in FIG. 5B. The reason for this is that when black addition operation and UCR operation is performed at half-tone portions, a problem arises such as a decline in the saturation of the half-tone portion. FIGS. 7A and 7B illustrate FIGS. 5A and 5B in a three-dimensional representation.

If the amount of undercolor removal is decreased so as to reduce black addition, a problem which arises is that gray must be expressed by the three colors of Y, M, C and it is difficult to reproduce gray faithfully.

In Japanese Patent Application Laid-Open Nos. 56-135842 and 56-140350, grayness G is defined and undercolor removal and blackening printing are carried out as indicated by the following equations, by way of example:.

$$K=\min(Y,M,C)$$

$$Y'=Y-\alpha \cdot (K-SP)Up$$

$$M'=M-\beta \cdot (K-SP)Up$$

$$C'=C-\gamma \cdot (K-SP)Up$$

$$K'=h_{(r,g,b,y,m,c)}UP$$

$h_{(r,g,b,y,m,c)}UP$ represents the amount of black addition subjected to a black addition masking correction.

Up=f(G), G=min/max

Figure 8:
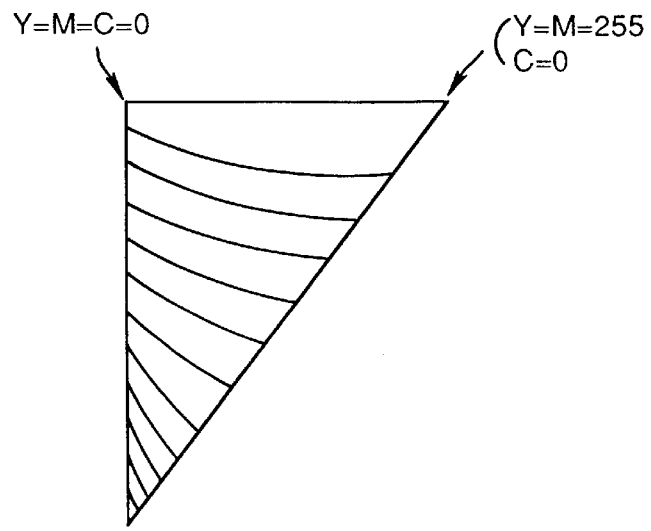
FIG. 8 is useful in describing the general characteristics of the black signal K"
Figure 9:
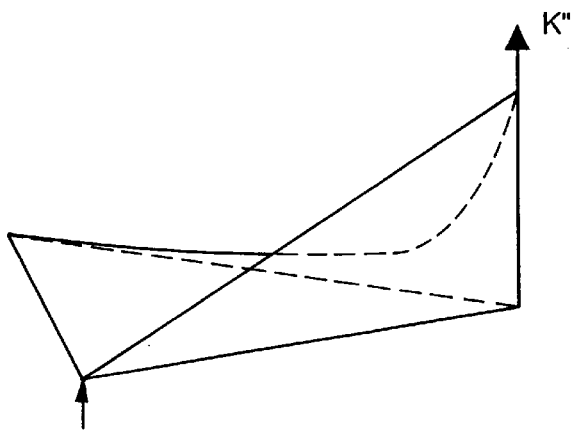
FIG. 9 is a diagram representing FIG. 8 three-dimensionally.

In order to simplify the description, it will be assumed that UP G holds and that $h_{(r,g,b,y,m,c)}=a(K-SP)$. As in the case described above, diagrams similar to FIG. 5B hold for K"=a(K-SP)·G and are shown in FIGS. 8 and 9. In this case, the contour lines are not linear, unlike FIG. 5B. The contour lines of K" have a tendency to decline as saturation rises, namely in the direction M=0→255 (in the case of eight bits). In other words, the higher the saturation, the smaller the value of K" and the more difficult it is to print black. This indicates that the amount of undercolor removal decreases and acts to prevent a decline in chromaticity while the reproducibility of gray is maintained.

However, in the example described above, the tendency of the rightwardly declining curve indicates an even greater decline to the right the larger the values of YMC become, i.e., the darker the area. This is disadvantageous in that, in a dark area not readily susceptible to the effect of the decline in saturation caused by undercolor removal, the amount of undercolor removal and the amount of black addition acts in a direction to decrease, and hence there is an increase in the amount of consumption of colorants such as ink or toner.

The second embodiment has been devised in order to solve this problem and its object is to provide an image processing apparatus capable of reducing the amount of colorant without sacrificing image quality.

Figure 10:
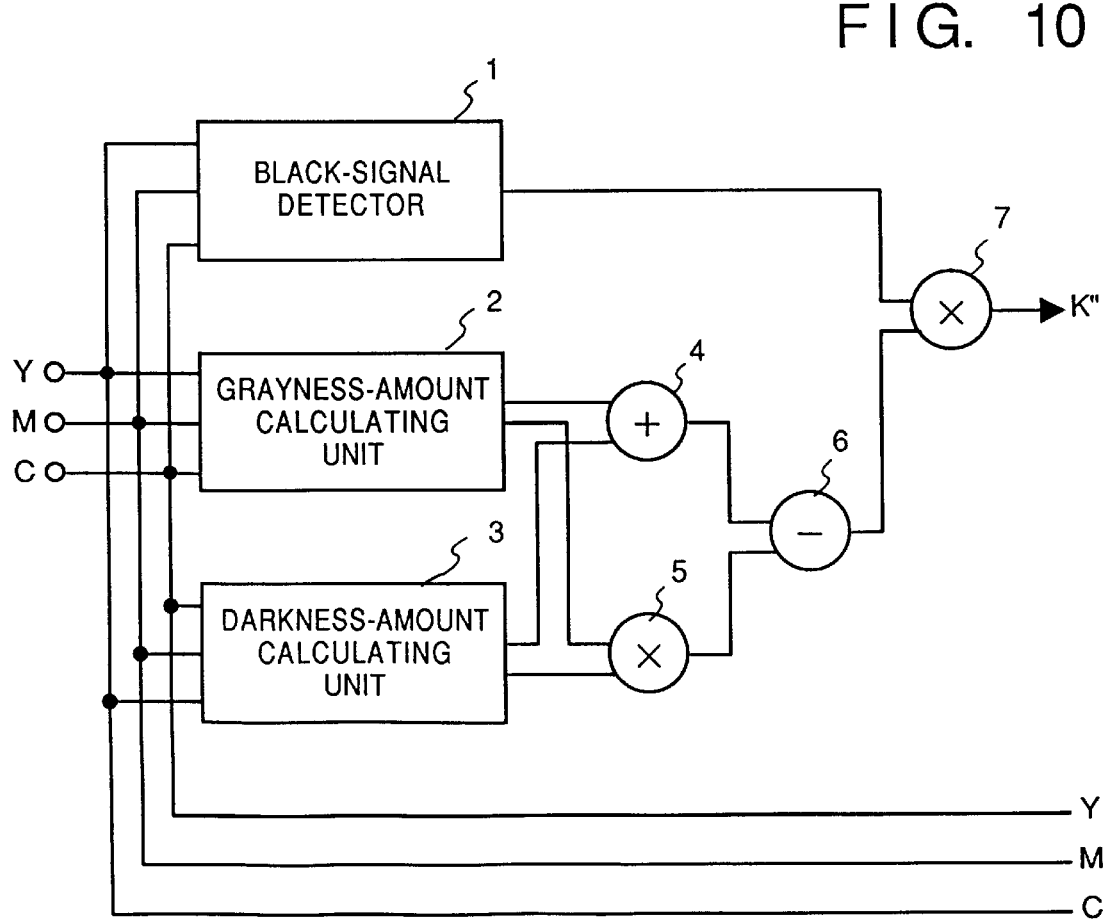
FIG. 10 is a block diagram illustrating the configuration of a black-signal extracting circuit according to a second embodiment of the present invention.
Figure 11:
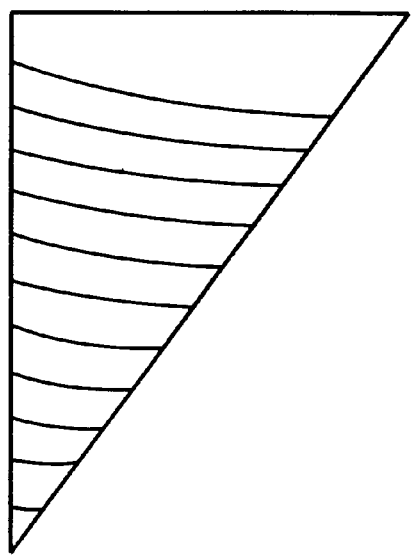
FIG. 11 is useful in describing the characteristics of a black signal K" according to the second embodiment.
Figure 12:
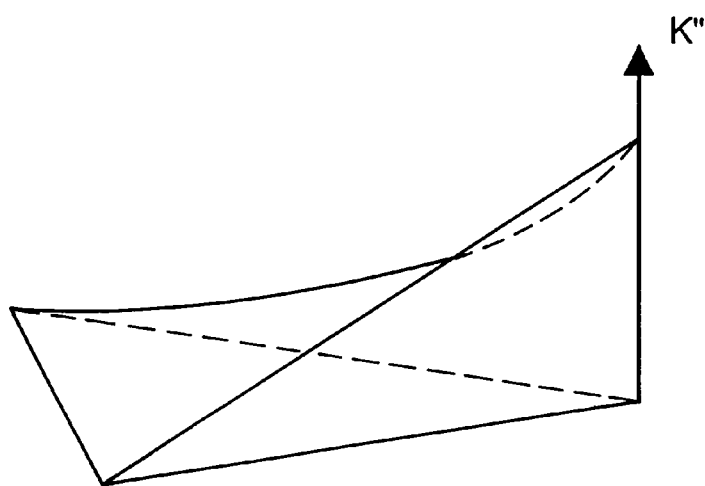
FIG. 12 is a diagram representing FIG. 11 three-dimensionally.

FIG. 10 is a block diagram illustrating the configuration of a black-signal extracting circuit according to the second embodiment. FIGS. 11 and 12 are diagrams illustrating the characteristics of K" in the second embodiment. FIG. 11 illustrates a display the same as that of FIG. 5B or FIG. 8. Here the characteristic of K" differs from that of FIG. 8. FIG. 11 illustrates that the further a dark portion is penetrated, the more the contour lines of K" approach the horizontal. FIG. 10 is a circuit block diagram for an example in which the characteristic of K" shown in FIG. 11 is satisfied. If the circuit block diagram shown in FIG. 10 is represented by a numerical formula, we will have the following:

$$K'' = \text{black signal} \times [(\text{amount of grayness} + \text{amount of darkness}) - (\text{amount of grayness} \times \text{amount of darkness})] \quad (9)$$

Here the black signal is detected by a black-signal detecting unit 1, the amount of grayness is obtained by a grayness-amount calculating unit 2, the amount of darkness is obtained by a darkness-amount calculating unit 3, and K'' is calculated by an adder 4, multipliers 5, 7 and a subtracter 6.

If we let min=min(Y,M,C) and max=max(Y,M,C) hold, then we have $$K'' = \min \times [(\min/\max + \min/255)$$
$$-(\min/\max) \times (\min/255)] \quad \ldots (10)$$

<Modification>

Besides min, $(YMC)^{1/3}$, $(Y+M+C)/3$ or the like may be used as black signals; besides min/max, $(YMC)^{1/3}/[(Y+M+C)/3]$, $\min/[(Y+M+C)/3]$, $\min/(YMC)^{1/3}$, $(YMC)^{1/3}/\max$, $[(Y+M+C)/3]/\max$ or the like may be used as the amount of grayness; and besides min/255, $[(Y+M+C)/3]255$, $(Y+M+C)^{1/3}/255$ or the like may be used as the amount of darkness. For example, the square or cube of each of these is permissible. By way of example, $(\min/255)^2$, $(\min/255)^3$ are permissible as the amount of darkness. Further, the combination of these (black signal, grayness, amount of darkness) is arbitrary.

Figure 13:
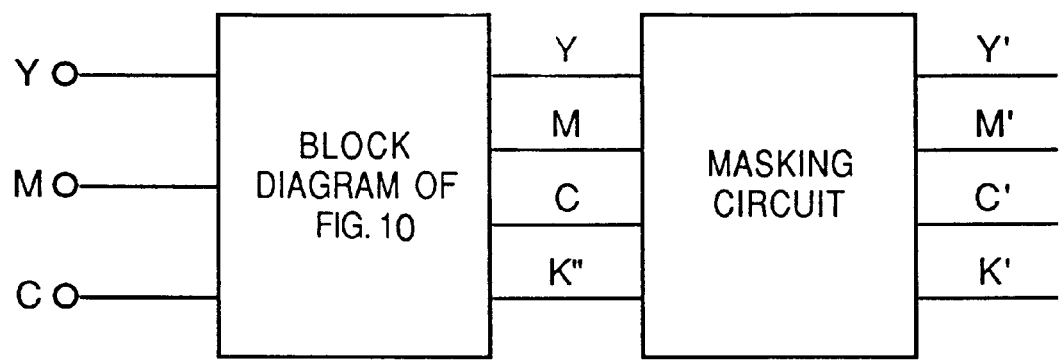
FIG. 13 is a block diagram illustrating an example of the configuration of a masking circuit.

Furthermore, using the signals K'', Y, M, C obtained in FIG. 10 as input signals of masking processing (e.g., any combination may be used, such as 4×4 in case of the first order, 4×14 if the second order is included, and 4×8 upon fabricating a term not used in the second order; orders higher than the third order also may be used) may be considered, as shown in FIG. 13. For example, in the example of 4×4, we have the following equation:

$$\begin{vmatrix} Y' \\ M' \\ C' \\ K' \end{vmatrix} = \begin{vmatrix} B_{11} & B_{12} & B_{13} & B_{14} \\ B_{21} & B_{22} & B_{23} & B_{24} \\ B_{31} & B_{32} & B_{33} & B_{34} \\ B_{41} & B_{42} & B_{43} & B_{44} \end{vmatrix} \begin{vmatrix} Y \\ M \\ C \\ K'' \end{vmatrix}$$

Figure 14:
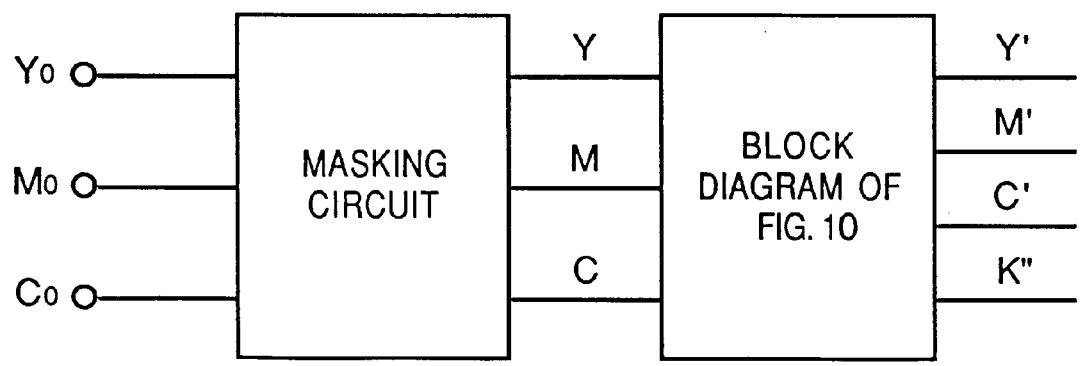
FIG. 14 is a block diagram illustrating an example of the configuration of a masking circuit.

Further, performing masking processing at a stage prior to the circuit of FIG. 10 also may be considered. In this case, we have the following equation (terms greater than that of the second order may be included) and FIG. 14:

$$\begin{vmatrix} Y \\ M \\ C \end{vmatrix} = \begin{vmatrix} C_{11} & C_{12} & C_{13} \\ C_{21} & C_{22} & C_{23} \\ C_{31} & C_{32} & C_{33} \end{vmatrix} \begin{vmatrix} Y_0 \\ M_0 \\ C_0 \end{vmatrix}$$

YMC may serve as the inputs of FIG. 10. Furthermore, an arithmetic circuit for masking can be provided before and after the circuit of FIG. 10. It does not matter if the inputs of FIG. 10 are RGB. In this case, transformation is made such as in the manner C=255−R, M=255−G, Y=255−B, after which processing such as shown in FIG. 10 may be performed.

Figure 15:
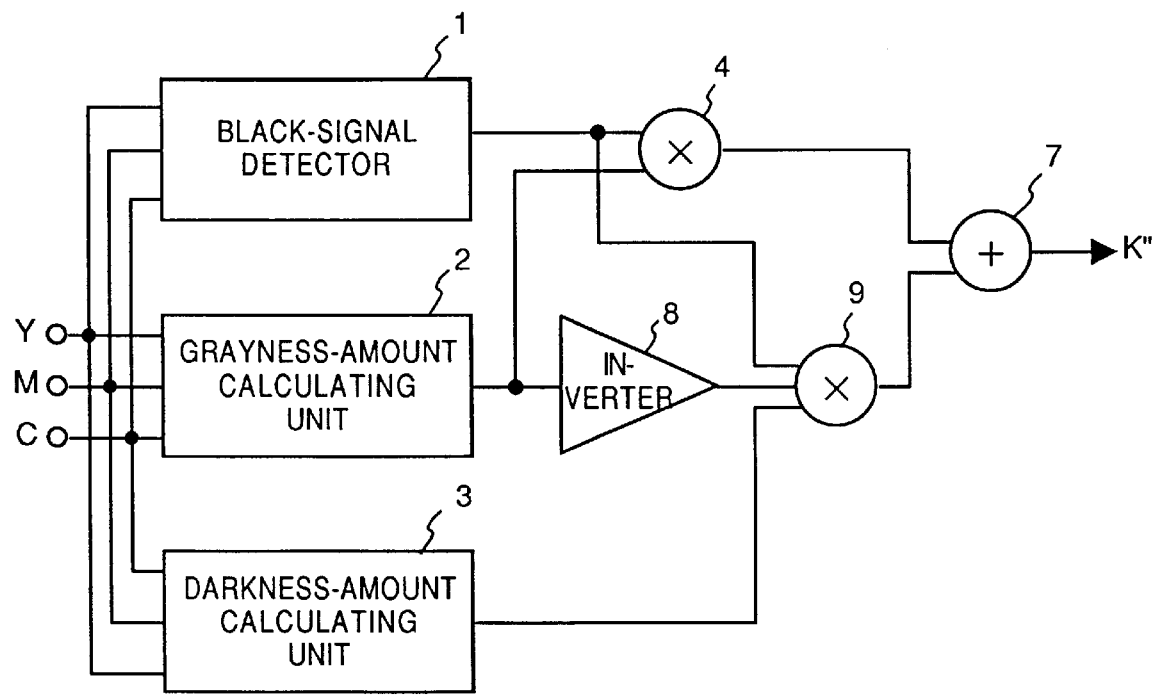
FIG. 15 is a block diagram illustrating the configuration of a black-signal extracting circuit according to a modification.

Furthermore, Equation (9) can be modified to K''=black signal×amount of grayness+black signal×(1−amount of grayness)×amount of darkness, and therefore it is possible to adopt an arrangement of the kind shown in FIG. 15.

Further, Equation (10) can be modified as follows:

$$K'' = \min^2[(1/\max + 1/255) - (1/\max)(\min/255)]$$

This means that calculation of $\min^2$, 1/max, 1/255, min in advance also may be considered. Accordingly, the circuit block diagram is not limited to FIGS. 10 and 15; any arrangement may be used so long as the characteristic of FIG. 11 is attained.

In accordance with the second embodiment, as described above, the black signal is controlled and varied inclusive of amount of darkness besides amount of grayness. As a result, amount of undercolor removal and amount of black addition may be increased in the grays of a highlighted portion. Amount of undercolor removal and amount of black addition in the saturated portions of dark portions may be decreased while the amount of undercolor removal and amount of black addition are held small in highly saturated areas of highlighted portions. As a result, the amount of colorant can be reduced without sacrificing image quality. This is very economical.

As many apparently widely different embodiments of the present invention can be made without departing from the spirit and scope thereof, it is to be understood that the invention is not limited to the specific embodiments thereof except as defined in the appended claims.

What is claimed is:

1. A color image processing apparatus for performing undercolor removal, comprising:

inputting means for inputting a color image signal;

first generating means for generating a grayness signal from the color image signal;

second generating means for generating a darkness signal from the color image signal;

undercolor removal means for performing undercolor removal based on the grayness signal, the darkness signal, and a black signal corresponding to the color image signal; and control means for controlling an amount of undercolor removal performed on the color image signal so that a gradient of an amount of undercolor removal performed on the color image signal relative to the grayness signal at a first darkness signal level is lower than a gradient of an amount of undercolor removal performed on the color image signal relative to the grayness signal at a second darkness signal level, wherein the second darkness signal level is lower than the first darkness signal level.

2. The apparatus according to claim 1, wherein the black signal, which is varied based upon Y (yellow), M (magenta) and C (cyan) signals of the color image signal is adopted as an input signal of masking processing.

3. The apparatus according to claim 2, wherein the undercolor removal means performs undercolor removal based upon the Y, M and C signals and the amount of undercolor removal controlled by the control means.

4. The apparatus according to claim 1, wherein the grayness signal becomes larger as the color image signal approaches achromaticity, and the darkness signal becomes larger as a density of the color image signal increases.

5. A color image processing method for performing undercolor removal, comprising the steps of:

inputting a color image signal;

generating a grayness signal from the color image signal;

generating a darkness signal from the color image signal;

performing undercolor removal based on the grayness signal, the darkness signal, and a black signal corresponding to the color image signal; and controlling an amount of undercolor removal performed on the color image signal so that a gradient of an amount of undercolor removal performed on the color image signal relative to the grayness signal at a first darkness signal level is lower than a gradient of an amount of undercolor removal performed on the color image signal relative to the grayness signal at a second darkness signal level, wherein the second darkness signal level is lower than the first darkness signal level.

6. The method according to claim 5, wherein the black signal, which is varied based upon Y (yellow), M (magenta) and C (cyan) signals of the color image signal is adopted as an input signal of masking processing.

7. The method according to claim 6, wherein the undercolor removal is performed based upon the Y, M and C signals and the amount of undercolor removal controlled in the controlling step.

8. The method according to claim 5, wherein the grayness signal becomes larger as the color image signal approaches achromaticity, and the darkness signal becomes larger as a density of the color image signal increases.

* * * * *

UNITED STATES PATENT AND TRADEMARK OFFICE
CERTIFICATE OF CORRECTION

PATENT NO. : 6,088,477
DATED : July 11, 2000
INVENTOR(S) : Ohta et al.

Page 1 of 1

It is certified that error appears in the above-identified patent and that said Letters Patent is hereby corrected as shown below:

Column 3:
Linbe 34, "signal" should read -- signals --; and
Line 35, "s enter" should read -- enter --.

Column 5:
Line 51, "$C' = C-\lambda \cdot (K-SP)$" should read -- $C' = C-\gamma \cdot (K-SP)$ --.

Signed and Sealed this

Twenty-first Day of August, 2001

Attest:

*Nicholas P. Godici*

NICHOLAS P. GODICI
*Attesting Officer*    *Acting Director of the United States Patent and Trademark Office*